US008548067B2

(12) United States Patent
Ivkovic et al.

(10) Patent No.: US 8,548,067 B2
(45) Date of Patent: Oct. 1, 2013

(54) SINGLE SENSOR RADIO SCENE ANALYSIS FOR PACKET BASED RADIO SIGNALS USING 2ND AND 4TH ORDER STATISTICS

(76) Inventors: Goran Ivkovic, Highland Park, NJ (US); Predrag Spasojevic, Highland Park, NJ (US); Ivan Seskar, Franklin Park, NJ (US)

(*) Notice: Subject to any disclaimer, the term of this patent is extended or adjusted under 35 U.S.C. 154(b) by 192 days.

(21) Appl. No.: 13/017,120

(22) Filed: Jan. 31, 2011

(65) Prior Publication Data
US 2011/0188395 A1    Aug. 4, 2011

Related U.S. Application Data

(60) Provisional application No. 61/299,406, filed on Jan. 29, 2010.

(51) Int. Cl.
*G01R 31/08* (2006.01)
(52) U.S. Cl.
USPC .......................................................... 375/252
(58) Field of Classification Search
USPC ......... 370/203, 204–215, 229–240, 310–394, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | |
|---|---|---|---|
| 6,931,362 B2 * | 8/2005 | Beadle et al. .................. 702/190 |
| 7,187,326 B2 * | 3/2007 | Beadle et al. .................. 342/451 |
| 7,630,379 B2 * | 12/2009 | Morishita et al. ........ 370/395.31 |
| 7,676,329 B2 * | 3/2010 | Garczarek et al. .............. 702/19 |
| 8,036,247 B2 * | 10/2011 | Frank et al. .................... 370/503 |
| 8,040,820 B2 * | 10/2011 | Pratap et al. ................... 370/254 |
| 8,085,804 B2 * | 12/2011 | Perlman et al. ................ 370/429 |
| 8,102,758 B2 * | 1/2012 | Monaghan et al. ........... 370/216 |
| 8,135,026 B2 * | 3/2012 | Khandekar .................... 370/431 |
| 8,270,439 B2 * | 9/2012 | Herr et al. ...................... 370/537 |
| 2003/0204380 A1 * | 10/2003 | Dishman et al. .............. 702/189 |
| 2004/0247054 A1 * | 12/2004 | Ferreol et al. ................. 375/340 |
| 2006/0080040 A1 * | 4/2006 | Garczarek et al. .............. 702/19 |
| 2012/0064928 A1 * | 3/2012 | Burchfiel ....................... 455/501 |
| 2012/0128086 A1 * | 5/2012 | Bouzegzi et al. ............. 375/260 |
| 2012/0287804 A1 * | 11/2012 | Sun et al. ....................... 370/252 |

* cited by examiner

*Primary Examiner* — Jung-Jen Liu
(74) *Attorney, Agent, or Firm* — Fox Rothschild LLP (57) ABSTRACT

We consider a problem of radio frequency (RF) signal analysis where one sensing node observes a frequency band possibly used by multiple packet based radio transmitters. Analysis of the received signal includes two steps. In the first step we use a spectrogram to perform temporal segmentation of the received nonstationary signal. This task may be formulated as a clustering problem. In the second step we compute a certain 2-D slice of the fourth order spectrum for each of the segments found in the first step. These fourth order spectrum slices are arraigned in a three-way array. One aspect of the second step is to use uniqueness properties of the low rank decomposition of the three-way array to recover spectra and associated activity sequences of individual components in the received signal. We derive a numerical algorithm for the low rank decomposition, which computes estimates of the spectra and activity sequences by optimizing certain weighted least squares criterion under application specific constraints. Certain embodiments are illustrated with simulation examples involving signals used in 802.11a/b/g and Bluetooth networks. The disclosed methods and related systems can be used as spectrum analysis tools, providing crucial information needed for achieving efficient utilization of radio spectrum and elimination of mutual interference between the coexisting systems.

10 Claims, 10 Drawing Sheets

SINGLE SENSOR RADIO SCENE ANALYSIS FOR PACKET BASED RADIO SIGNALS USING 2ND AND 4TH ORDER STATISTICS

CROSS REFERENCE TO RELATED APPLICATIONS

The present application claims priority under 35 U.S.C. §119(e) to U.S. Provisional Application Ser. No. 61/299,406, filed on Jan. 29, 2010, which is hereby incorporated by reference in its entirety.

BACKGROUND

Most existing wireless systems use static allocation of radio spectrum. Each system operates in a predefined fixed frequency band. Since the allocated spectrum is not used at all locations and at all time instants, this static allocation leads to creation of spectrum holes, which implies inefficient utilization of the available radio spectrum. A much better spectrum utilization can be achieved with systems using dynamic spectrum allocation. These systems must have a completely new feature: spectrum sensing capability. Spectrum sensing can be defined as RF signal analysis whose goal is to determine if the observed frequency band is occupied and possibly identify or characterize the signals present.

It is therefore desirable to have systems and methods that analyze RF signals.

DETAILED DESCRIPTION

1. Introduction

Most of the existing work in spectrum sensing is motivated by application in the emerging 802.22 standard, where the goal is to detect presence of a so-called primary user, which in this case is a digital TV signal in the 400-800 MHz frequency band. This task is formulated as a binary hypothesis testing problem, which is appropriate for detection of a single signal in noise.

Three main signal processing tools include energy and related PSD based detectors, matched filter and cyclostationary detectors.

In this work we consider the spectrum sensing problems arising when the transmitters of interest form packet based radio networks. These networks are common in unlicensed frequency bands such as 2.4 GHz ISM and 5 GHz UNII bands, which are used by systems such as WLAN (802.11a/b/g), Bluetooth, Zig-Bee, cordless phones, etc. There are two application scenarios for spectrum sensing in this environment. In the first scenario, there is a communication network which identifies and exploits unused portions of the spectrum in the observed frequency band. In the second scenario there is a dedicated spectrum sensing network. This concept is adopted in the emerging IEEE 1900.6 standard. In this concept there are three types of systems: existing systems using static spectrum allocation, dedicated spectrum sensing network, and new systems using dynamic spectrum allocation. The role of the spectrum sensing network is to provide information about spectrum usage in the observed frequency band. This information can be used by new communication systems to access the available spectrum without causing interference to the existing systems. Hence, the information provided by the spectrum sensing network could be crucial for achieving efficient utilization of radio spectrum. Spectrum sensing network could also be used for continuous monitoring of spectrum usage, detection and localization of transmitters violating established protocols for spectrum access, etc.

In the environment with packet based radio networks there are two key differences compared to the problems considered in the previous work. The first is the presence of multiple, possibly heterogeneous, transmitters, which in some cases transmit signals that overlap in time and frequency. The second difference is due to the fact that transmitters in packet based networks are regulated by their protocols and can transmit only in certain time slots. Thus, the transmitted signals are characterized by non-persistent excitation.

Let us now discuss the applicability of existing approaches for spectrum sensing in this scenario. An obvious brute force approach would consist in building a full receiver for each signal type. This approach would require complete knowledge of each transmitted signal format including the set of possible center frequencies. This approach is not only expensive and complicated, but also excessive since the goal here is to detect and identify the signals present and not to demodulate their transmitted information. A much simpler approach would be to use preambles, which are sequences of known symbols embedded in packets to enable packet detection and synchronization. If these known sequences exist we can build matched filter detectors for them and thus detect and identify signals present. To do so we must build a separate detector for each signal format. This approach would also require the knowledge of possible center frequencies for each system. The required information for this approach may not be readily available for some systems (e.g., cordless phones). Performance of the matched filter detector in an ideal case of fully known signal in Gaussian noise is limited by the total signal energy, which in this application is limited by the duration of the preamble. In the real world the received preamble sequence is never fully known since its time of arrival is random and the signal is distorted by multipath and possible frequency offsets. These facts would complicate implementation of the method and further limit its performance. Finally, we note that presence of signals with non-persistent excitation prevents straightforward application of energy, PSD based, and cyclostationary detectors, since they all assume signals with persistent excitation during the observation interval.

We conclude that existing approaches do not offer a satisfactory solution in this scenario. Here, we present an entirely different approach. Each transmitted signal is characterized using its 2nd and 4th order statistics and an on/off activity sequence modeling its non-persistent excitation. The sensing node receives a superposition of these signals. As will be shown, using the 2nd and 4th order statistics of the received signal and certain uniqueness properties of low rank decomposition of three-way arrays, it is possible to identify spectra and activity sequences of individual signals forming the received signal. In other words, in contrast to existing spectrum sensing methods based on hypothesis testing (usually binary), we characterize each signal present by blind identification of its relevant parameters. The method is blind in a sense that the knowledge of signal pulse shapes and their center frequencies is not assumed, which is an important advantage over matched filter based demodulation or detection where this knowledge is crucial.

2. Signal Analysis Method

We consider a setup where one sensing node observes a frequency band with M packet based radio sources. Now we make a number of assumptions. During the observation interval each source operates with constant power when on. However, the excitation is not persistent, which is modeled by an on/off activity sequence. We consider two types of transmitted signals: (1) linear modulation formats and (2) nonlinear modulation formats that can be approximated as a sum of finite number of signals in linear modulation formats. The transmitted signals can be characterized using their various statistical indicators. In this work we will use second order statistics (PSD) and partial information form fourth order statistics. Hence, each transmitted signal will be characterized by its second and fourth order spectra and an associated on/off activity sequence modelling its nonstationary behaviour. The received signal at the sensing node is a sum of the transmitted signals and sensor noise. We assume that each transmitted signal is non-Gaussian and the sensor noise is a stationary Gaussian signal with arbitrary PSD. One embodiment of our approach performs analysis of the received signal in two steps. In the first step we perform temporal segmentation of the received nonstationary signal using its spectrogram. In the second step we use partial information from the fourth order spectra computed for the segments found in the first step to find spectra and activity sequences of individual signals forming the received signal.

2.1 Temporal Segmentation Algorithm

Under the stated assumptions the received signal has on/off contributions from various transmitted signals and stationary sensor noise. Thus, this signal is nonstationary having a number of stationary segments. Our goal is to determine those segments. We are going to assume that each segment is uniquely identified by its PSD and use spectrogram of the received signal for this task. Let T be the time resolution of the spectrogram. Assuming mutually uncorrelated source signals, the received PSD as a function of frequency f over the time interval $[(k-1)T, kT]$ is:

$$S(f,k) = \sum_{m=1}^{M} |H_m(f)|^2 S_m(f) b_{km} + S_n(f) \quad (1)$$

where $H_m(f)$ is the channel transfer function between the m-th source and the sensor, $S_m(f)$ is PSD of the m-th source and $b_{km} \in \{0,1\}$ indicates whether the m-th source is off or on during the time interval $[(k-1)T, kT]$. It is also assumed that the sensor noise is uncorrelated with source signals and has a PSD $S_n(f)$. The choice of T is the result of the inevitable trade-off between accuracy in tracking non-stationary changes of the source signals (a smaller T is better) and the achievable resolution in PSD estimation (a larger T is better). Let K measurements be performed over the observation interval of length KT. Let the PSD estimation be performed with frequency resolution $\Delta f$ over the total bandwidth W. We define the matrix X with entries $$X(j,k) = \int_{(j-1)\Delta f}^{j\Delta f} S(f,k)\, df = \sum_{p=1}^{M} a_{jm} b_{km} + n_j \quad (2)$$

where $a_{jm} = \int_{(j-1)\Delta f}^{j\Delta f} |H_m(f)|^2 S_m(f) df$ for $j=1, \ldots, J$, $J=W/\Delta f$ and, $n_j = \int_{(j-1)\Delta f}^{j\Delta f} S_n(f) df$. In an obvious matrix notation we have $$X = [A\ n][B\ 1]^T \quad (3)$$

where $A = [a_{jm}] = [a_1 \ldots a_M]$, $n = [n_j]$, and $B = [b_{km}]$. We observe that the columns of X may form clusters, where each cluster corresponds to a union of time segments with the same combination of active sources. For example, the cluster centroids could be $n$, $a_1+n$, $a_1+a_2+n$, etc. Hence, the segmentation problem may in fact be a clustering problem. We may model the columns of X using the mixture pdf model $$f(x) = \sum_{i=1}^{N} p_i g(x|\mu_i, \Sigma_i) \quad (4)$$

where N is the number of clusters, $p_i$ is the probability of the i-th cluster, and $g(x|\mu_i, \Sigma_i)$ is a multivariate Gaussian pdf with mean $\mu_i$ and covariance $\Sigma_i$. Dispersion around cluster means is caused by inevitable PSD estimation errors due to the finite sample size effects. True distribution of these errors is signal dependent and hence, may be unknown in our application. However, we observe that most nonparametric PSD estimation methods estimate each PSD value by averaging in time or frequency, and hence it makes sense to assume that the estimation errors are approximately Gaussian. Assuming the model given by (4) the clustering problem reduces to the estimation of the parameters $p_i$, $\mu_i$, and $\Sigma_i$ for $i=1, \ldots, N$. Maximum likelihood estimates of these parameters may be obtained using an EM algorithm as follows. Let us define the cluster membership matrix $W = [w_{ik}]$, where $w_{ik} = 1$ if the k-th column of X belongs to the i-th cluster, otherwise $w_{ik} = 0$. Assuming the model parameters are known $w_{ik}$ can be estimated as its expected value, which can be found using the Bayes' rule as $$\hat{w}_{ik} = P(C_i|x_k) = \frac{p_i g(x_k|\mu_i, \Sigma_i)}{\sum_{i=1}^{N} p_i g(x_k|\mu_i, \Sigma_i)}. \quad (5)$$

where $P(C_i|x_k)$ is the probability that the k-th column of X belongs to the i-th cluster. Assuming now that W is known the ML estimates of the model parameters are given as $$\hat{p}_i = \frac{1}{K}\sum_{k=1}^{K} w_{ik},\ \hat{\mu}_i = \frac{\sum_{k=1}^{K} w_{ik} x_k}{\sum_{k=1}^{K} w_{ik}}, \quad (6)$$

and $$\hat{\Sigma}_i = \frac{\sum_{k=1}^{K} w_{ik}(x_k - \hat{\mu}_i)(x_k - \hat{\mu}_i)^T}{\sum_{k=1}^{K} w_{ik}}. \quad (7)$$

In certain embodiments we start from random initial estimates for the model parameters and then use equations (5)-(7)

until convergence. The algorithm converges monotonically to a local maximum of the likelihood function of the model (4). The global maximum may be found by repeatedly using the algorithm from different initial points. This concludes the segmentation procedure. Now we would like to know what combination of transmitted signals were present in addition to sensor noise in each of the identified signal segments. It may be difficult to answer this question reliably using only PSD information. As it will become clear, we can get a satisfactory answer to this question by using information contained in fourth order spectrum.

2.2 Signal Analysis Using Fourth Order Spectrum

Let us first introduce a few definitions. Let $x(t)$ be a random process admitting Cramer spectral representation $x(t) = \int_{-\infty}^{\infty} e^{j2\pi ft} dX(f)$ where $dX(f)$ is called spectral process. The second order spectrum (PSD) of $x(t)$ may be defined as $S_{2x}(f)df = E[|dX(f)|^2]$ and the fourth order spectrum (trispectrum) may be defined as $$S_{4x}(f_1,f_2,f_3)df_1df_2df_3 = \mathrm{cum}(dX(f_1), dX(f_2), dX(-f_3)^*,$$
$$dX(f_1+f_2+f_3)^*) = E[dX(f_1)dX(f_2)dX(-f_3)^*dX(f_1+$$
$$f_2+f_3)^*] - E[dX(f_1)dX(f_2)]E[dX(-f_3)^*dX(f_1+f_2+$$
$$f_3)^*] - E[dX(f_1)dX(-f_3)^*]E[dX(f_2)dX(f_1+f_2+f_3)^*] -$$
$$E[dX(f_1)dX(f_1+f_2+f_3)^*]E[dX(f_2)dX(-f_3)^*] \quad (8)$$

where we used the definition of the fourth order cumulants. In various embodiments we may use the following 2-D slice of the trispectrum $\tilde{S}_{4x}(f,v) = S_{4x}(f,v,-v)$ which using the definition (8) can be written as $$\tilde{S}_{4x}(f,v)dfdv = \mathrm{cum}(dX(f), dX(v), dX(v)^*, dX(f)^*). \quad (9)$$

The quantity $\tilde{S}_{4x}(f,v)$ for $f=v$ is the 4-th order autocumulant (kurtosis) at frequency $f$. It is zero for Gaussian signals and non-zero for most non-Gaussian signals. Thus, it can be interpreted as deviation from Gaussianity at frequency $f$. The quantity $\tilde{S}_{4x}(f,v)$ for $f \neq v$ measures a certain form of statistical dependency between spectral components at frequencies $f$ and $v$. In contrast, the PSD $S_{2x}(f)$ measures only average power at frequency $f$ and contains no information about statistical dependencies between spectral components at different frequencies. Hence, the slice $\tilde{S}_{4x}(f,v)$ contains significant information about the received signal, which is not present in its PSD.

Let $\tilde{S}_4(f,v,i)$ be the trispectrum slice defined above for the i-th segment (cluster) found in the first step of the algorithm. Assuming statistically independent signals we have $$\tilde{S}_4(f, v, i) = \sum_{m=1}^{M} |H_m(f)|^2 |H_m(v)|^2 \tilde{S}_{4m}(f, v) c_{im} + \tilde{S}_{4n}(f, v) \quad (10)$$

where $\tilde{S}'_{4m}(f,v)$ is the trispectrum slice of the m-th source and $c_{im} \in \{0,1\}$ indicates whether the m-th source is on in the i-th segment for $i=1, \ldots, N$. Since we assumed the receiver noise is Gaussian, we have $\tilde{S}_{4n}(f,v) = 0$. Hence, using the fourth order spectrum we can discriminate between communication signals which are practically always non-Gaussian and Gaussian receiver noise. Let us define a three-way array Y with entries $$Y(j, n, i) = \int_{(j-1)\Delta f}^{j\Delta f} \int_{(n-1)\Delta f}^{n\Delta f} \tilde{S}_4(f, v, i) df dv = \sum_{m=1}^{M} q_{jnm} c_{im} \quad (11)$$

where $q_{jnm} = \int_{(j-1)\Delta f}^{j\Delta f} \int_{(n-1)\Delta f}^{n\Delta f} |H_m(f)|^2 |H_m(v)|^2 \tilde{S}_{4m}(f,v) dfdv$ for $j,n=1, \ldots, J$. As defined earlier $J=W/\Delta f$, where W is the total observed bandwidth. Let $Y_i$ be the J by J matrix obtained by fixing the index i in (11). We have $$Y_i = \sum_{m=1}^{M} Q_m c_{im} \quad (12)$$

where $Q_m = [q_{jnm}]$ is the matrix characterizing the m-th source. These matrices depend on transmitted signal formats. We consider two classes of transmitted signals.

Linear Modulation Formats.

We now consider an important class of linear modulations where the m-th source signal has the following form $$x_m(t) = \sum_{k=-\infty}^{\infty} a_{km} p_m(t - kT_{sm}) \quad (13)$$

where $a_{km}$ is an iid sequence of input symbols, $p_m(t)$ is the pulse shape, and $T_{sm}$ is the symbol period. Using the definition it can be shown that the trispectrum of $x_m(t)$ is $$S_{4m}(f_1, f_2, f_3) = \frac{S_{4am}(f_1, f_2, f_3)}{T_{sm}} P_m(f_1) P_m(f_2) \quad (14)$$
$$P_m(-f_3)^* P_m(f_1 + f_2 + f_3)^*$$

where $P_m(f) = \int_{-\infty}^{\infty} p_m(t) e^{-j2\pi ft} dt$. Since $a_{km}$ is an iid sequence $S_{4am}(f_1,f_2,f_3) = \gamma_{4am} = \mathrm{cum}(a_{km}, a_{km}, a_{km}^*, a_{km}^*)$. Using (9) we have $$\tilde{S}_{4m}(f,v) dfdv = k_m |P_m(f)|^2 |P_m(v)|^2 \quad (15)$$

where $k_m = \gamma_{4am}/T_{sm}$. It follows that $q_{jnm} = k_m f_{jm} f_{nm}$, where $f_{jm} = \int_{(j-1)\Delta f}^{n\Delta f} |H_m(f)|^2 |P_m(f)|^2 df$. We see that for linear modulation formats $Q_m$ is of rank one. In this case the entries of Y are $$Y(j, n, i) = \sum_{m=1}^{M} k_m f_{jm} f_{nm} c_{im}. \quad (16)$$

Now we observe that $$Y_i = F \Lambda_i F^T \quad (17)$$

where $F = [f_{jm}]$ and $\Lambda_i = \mathrm{diag}([k_1 c_{i1} \ldots k_M c_{iM}])$. We see that the matrix F jointly diagonalizes the matrices $Y_i$ for $i=1, \ldots, N$. The problem of finding F from the set of matrices $Y_i$ for $i=1, \ldots, N$ is known as joint diagonalization by congruence. Under some mild conditions, the matrices F and $C=[c_{im}]$ can be determined up to a scaling and permutation of their columns by joint diagonalization of the matrices $Y_i$ for $i=1, \ldots, N$. Other blind signal separation methods may also reduce to joint diagonalization problems. We observe that (16) represents decomposition of Y into M three-way rank-one terms. This decomposition is unique under certain algebraic conditions. When the uniqueness conditions hold the rank-one terms in (16) are uniquely determined. In other words, we can uniquely determine terms in the sum in (16), which represent contributions of different transmitted signals to the observed three-way array Y. Thus, the decomposition of Y into rank-one terms becomes a parameter estimation tool.

Nonlinear Modulation Formats.

When the source signals are in nonlinear modulation formats (e.g., FM signals), we may not be able to put the trispectrum slices $\tilde{S}_{4m}(f,v)$ in the form given by (15). In that case rank$(Q_m)>1$ and the above procedure may not be applicable. Nonlinearity is not a property and therefore it may not be treatable without introducing additional assumptions. Let us assume that the m-th source signal can be represented or approximated as a sum of $R_m$ signals in linear format given by (13). Then its trispectrum slice can be represented as $$Q_m = \sum_{r=1}^{R_m} k_{rm} f_r^{(m)} f_r^{(m)T} = F_m D_m F_m^T \quad (18)$$

where $D_m = \text{diag}([k_{1m} \ldots k_{R_m,m}])$ contains constants defined in (15) and $F_m = [f_1^{(m)} \ldots f_{R_m}^{(m)}]$ contains the associated squared magnitude frequency responses of the linear signals used to represent the m-th source signal. The entries of Y can be written as $$Y(j,n,i) = \sum_{m=1}^{M} q_{jnm} c_{im} = \sum_{m=1}^{M} \sum_{r=1}^{R_m} k_{rm} f_{jrm} f_{nrm} c_{im} \quad (19)$$

where $F_m(j,r) = f_{jrm}$. Equation (19) represents decomposition of Y into M block terms. Now each signal contributes one block term rather than one rank-one term, which was the case with linear modulation formats. Using the operator vecr which transforms real symmetric matrix into a vector, the decomposition into block terms can be represented as $$Y_V = [\text{vecr}(Y_1) \ldots \text{vecr}(Y_N)] = F_V K C^T \quad (20)$$

where $$F_V = [\text{vecr}(f_1^{(1)} f_1^{(1)T}) \ldots \text{vecr}(f_{R_1}^{(1)} f_{R_1}^{(1)T}) \ldots \\ \text{vecr}(f_1^{(M)} f_1^{(M)T}) \ldots \text{vecr}(f_{R_M}^{(M)} f_{R_M}^{(M)T})], \quad (21)$$

$$K = \begin{bmatrix} k_{11} & 0 & \ldots & 0 \\ \vdots & \vdots & \ddots & \vdots \\ k_{R_1,1} & 0 & \ldots & 0 \\ 0 & k_{12} & \ldots & 0 \\ \vdots & \vdots & \ddots & \vdots \\ 0 & k_{R_2,2} & \ldots & 0 \\ \vdots & \vdots & \ddots & \vdots \\ 0 & 0 & \ldots & k_{1,M} \\ \vdots & \vdots & \ddots & \vdots \\ 0 & 0 & \ldots & k_{R_M,M} \end{bmatrix}, \quad (22)$$

and $C = [c_{im}]$ is an N by M matrix defined earlier with entries $c_{im} \in \{0,1\}$. We note that decomposition into rank-one terms is a special case of the decomposition into block terms obtained for $R_1 = \ldots = R_M = 1$. The decomposition into block terms can also be unique under certain algebraic conditions. When these conditions hold block terms in (19), representing contributions of different transmitted signals to Y, are uniquely determined and hence, the decomposition of Y into block terms becomes a parameter estimation tool.

Some uniqueness conditions do not take into account our application specific constraints: symmetry ($Y_i = Y_i^T$), nonnegativity ($f_{jrm} \geq 0$), and finite alphabet ($c_{im} \in \{0,1\}$). Hence, embodiment uniqueness conditions in our application are probably even less restrictive than others. As will be demonstrated with concrete examples in section IV, decomposition of Y into rank-one or block terms provides a useful signal analysis tool in some important practical situations.

3 Computational Methods

In this section we develop embodiment algorithms to compute an estimate of the three-way Y and to decompose it into block terms, which represent contributions of individual signals present in the received signal.

3.1 Estimation of Fourth Order Spectra

A first step is to compute estimates of the trispectrum matrices $Y_i$ for each of the N temporal segments found in the first step. Let $y_k$ be the column vector computed by applying FFT on the received signal samples over the k-th time interval defined in (1) for $k=1, \ldots, K$. We compute an estimate of $Y_i$ by replacing $dX(f)$ in (9) with the corresponding entries from $y_k$ and performing averaging over the i-th temporal segment $$\hat{Y}_i = \quad (23)$$

$$\frac{1}{\tau_i} \sum_{k=1}^{K} \hat{w}_{ik} (y_k \cdot y_k^*)(y_k \cdot y_k^*)^T - \left(\frac{1}{\tau_i} \sum_{k=1}^{K} \hat{w}_{ik} y_k y_k^T\right) \cdot \left(\frac{1}{\tau_i} \sum_{k=1}^{K} \hat{w}_{ik} y_k y_k^T\right)^* - $$

$$\left(\frac{1}{\tau_i} \sum_{k=1}^{K} \hat{w}_{ik} y_k y_k^H\right) \cdot \left(\frac{1}{\tau_i} \sum_{k=1}^{K} \hat{w}_{ik} y_k y_k^H\right)^* - $$

$$\left(\frac{1}{\tau_i} \sum_{k=1}^{K} \hat{w}_{ik} (y_k \cdot y_k^*)\right) \left(\frac{1}{\tau_i} \sum_{k=1}^{K} \hat{w}_{ik} (y_k \cdot y_k^*)^T\right)$$

where $\cdot$ denotes elementwise (Hadamard) matrix product, $\tau_i = \sum_{k=1}^{K} \hat{w}_{ik}$ and $\hat{w}_{ik}$ are estimates from (5) computed using (5)-(7). The estimate $\hat{Y}_i$ is computed by temporal averaging. Additional frequency averaging can be done by applying a 2D interpolation filter on $\hat{Y}_i$. The estimates of fourth order spectra computed over the determined temporal segments have much smaller variance compared to the corresponding estimates computed over the time intervals of duration T defined in (1). This fact explains why temporal segmentation may be performed as the first step.

3.2 Determining the Number of Rank-One and Block Terms

Another objective is to develop an algorithm for decomposition of Y into block terms given by (19) and (20). In order to do that we determine the number of block terms M and the number of rank-one terms in each of the block terms $R_1, \ldots, R_M$. In this subsection we describe how (at least in theory) the parameters M and $R = R_1 + \ldots + R_M$ can be determined from Y. First, we apply MY operator on (12) for $i = 1, \ldots, N$. We have $$[\text{vecr}(Y_1) \ldots \text{vecr}(Y_N)] = Q_V C^T \quad (24)$$

where $$Q_V = [\text{vecr}(Q_1) \ldots \text{vecr}(Q_M)]. \quad (25)$$

Assuming that $$J + \binom{J}{2} \geq M,$$

$N \geq M$, and that $Q_V$ and C are of full rank we have $$\text{rank}([\text{vecr}(Y_1) \ldots \text{vecr}(Y_N)]) = M \quad (26)$$

which can be used to determine M. Next, we show how $R=R_1+\ldots+R_M$ can be found from Y. Using (12) and (18) we have $$Y_i = F_A L_i F_A^T \quad (27)$$

where $$F_A = [F_1 \ldots F_M] \quad (28)$$

and $$L_i = \text{diag}(L(i,:)) \quad (29)$$

where $L(i,:)$ is the i-th row of the matrix $$L = \begin{bmatrix} k_{11}c_{11} & \ldots & k_{11}c_{N1} \\ \vdots & \ddots & \vdots \\ k_{R_1,1}c_{11} & \ldots & k_{R_1,1}c_{N1} \\ \vdots & \ddots & \vdots \\ k_{1M}c_{1M} & \ldots & k_{11}c_{NM} \\ \vdots & \ddots & \vdots \\ k_{R_M,M}c_{1M} & \ldots & k_{R_M,M}c_{NM} \end{bmatrix}^T . \quad (30)$$

It is very simple to check that $$[Y_1 \ldots Y_N] = F_A (LeF_A)^T \quad (31)$$

where the symbol e denotes Khatri-Rao product defined as $$LeF_A = [L(:,1) \otimes F_A(:,1) \ldots L(:,R) \otimes F_A(:,R)] \quad (32)$$

where the symbol $\otimes$ denotes Kronecker product. Assuming that $J \geq R$, rank($F_A$)=R, and rank($LeF_A$)=R we have $$\text{rank}([Y_1 \ldots Y_N]) = R \quad (33)$$

which can be used to determine R.

If Y is perfectly known M and R can be found from SVDs of the matrices in (26) and (33). In any practical situation only an estimate $\hat{Y}$, containing some amount of error, is available. In that case M and R can be found as effective ranks of the matrices given by (26) and (33). In the simulation examples presented in Section IV the parameters M and R are assumed to be known.

3.3 Decomposition into Rank-One Terms

In this subsection we develop an algorithm for decomposition of Y into rank-one terms given by (16). We have seen that this decomposition is equivalent to joint diagonalization of the set of matrices $Y_i$ for $i=1, \ldots, N$. There are several numerical algorithms for joint diagonalization problems, but they may not take into account our application specific constraints. Here, we develop an algorithm specifically for this application. In order to compute the decomposition given by (16), we form the following weighted least squares criterion $$C_{wls} = \sum_{j=1}^{J} \sum_{n=j}^{J} \sum_{i=1}^{N} \omega_i \left( \hat{Y}(j,n,i) - \sum_{m=1}^{M} k_m f_{jm} f_{nm} c_{im} \right)^2 . \quad (34)$$

where $\hat{Y}(j,n,i)$ is the observed (estimated) value given by $\hat{Y}(j,n,i)=Y(j,n,i)+E(j,n,i)$ where $E(j,n,i)$ is the estimation error. We may also used the symmetry $\hat{Y}(j,n,i)=\hat{Y}(n,j,i)$. One reasonable choice for weights may be $\omega_i = \hat{p}_i$, since each matrix $\hat{Y}_i$ is estimated from a cluster with probability $p_i$ as defined in (4). We may seek parameters $F=[f_{jm}]$, $C=[c_{im}]$, and $k=[k_1 \ldots k_M]^T$ that minimize $C_{wls}$ subject to the constraints $f_{jm} \geq 0$ and $c_{im} \in \{0,1\}$. First, we may solve the problem where the second constraint is relaxed to $c_{im} \geq 0$. We will explain in the next section how to impose $c_{im} \in \{0,1\}$. We may seek parameter estimates satisfying $$[\hat{F}, \hat{C}, \hat{k}] = \underset{F \geq 0, C \geq 0, k}{\text{argmin}} C_{wls}(F, C, k). \quad (35)$$

Next, we apply certain tools for numerical optimization on problem (35). Our first step is to take into account nonnegativity constraints using logarithmic barrier function. We define new criterion $$C_{bf} = C_{wls} - \alpha \left( \sum_{j=1}^{J} \sum_{m=1}^{M} \log f_{jm} + \sum_{i=1}^{N} \sum_{m=1}^{M} \log c_{im} \right) \quad (36)$$

where $\alpha$ is a small positive constant, which regulates influence of the added logarithmic terms. When any of the parameters with nonnegative constraint, say $f_{jm}$, approaches zero its logarithmic term tends to negative infinity. Hence, $C_{bf}$ tends to plus infinity, which prevents that parameter from becoming zero or negative. Now we can consider the unconstrained problem $$[\hat{F}, \hat{C}, \hat{k}] = \underset{F,C,k}{\text{argmin}} C_{bf}(F, C, k). \quad (37)$$

We may solve (37) using Newton's method. We define the parameter vector $$p = [\text{vec}(F)^T \text{vec}(C)^T K^T]^T. \quad (38)$$

Starting from an initial point we update parameter vector p in each step as follows. Let $p_0$ be the current parameter vector. We may approximate the objective function around the current point using quadratic approximation $$C_{bf}(p_0 + \Delta p) \approx C_{bf}(p_0) + g^T \Delta p + \tfrac{1}{2} \Delta p^T H \Delta p \quad (39)$$

where g is gradient and H is Hessian of $C_{bf}(p)$. We find the step $\Delta p$ by solving $$\min_{\Delta p} g^T \Delta p + \frac{1}{2} \Delta p^T H \Delta p \quad (40)$$

For positive definite H the optimal step is found from $$g + H \Delta p = 0 \quad (41)$$

and the updated parameter vector is $$p = p_0 + \Delta_p. \quad (42)$$

However, there may be a problem in direct application of Newton's method on minimization of $C_{bf}(p)$. As mentioned previously the columns of F and C are determined up to arbitrary scaling factors. This means that there may be no unique vector p that minimizes $C_{bf}(p)$. In other words, the problem of minimizing $C_{bf}(p)$ may have a continuum of solutions rather than one solution. In vicinity of any of these solutions there may be no unique solution for $\Delta p$ in (41) and hence, H may be singular. This problem is solved by imposing unit length constraints on the columns of F and C. Since the entries are nonnegative, in certain embodiments we can impose the following constraints: $\Sigma_{j=1}^{J} f_{jm} = 1$ and $\Sigma_{i=1}^{N} c_{im} = 1$ for m=1, ..., M. These constraints can be expressed as $A_{eq}p=1$ where $A_{eq}$ is a 2M by (J+N+1)M matrix of zeros and ones. Now we may minimize $C_{bf}(p)$ subject to linear constraints $A_{eq}p=1$, which can be done using, for example, known methods. It follows from (42) $A_{eq}p=A_{eq}(p_0+\Delta p)$. Since the equality constraint must be satisfied in every iteration, we also have $A_{eq}p=A_{eq}p_0=1$, which implies $A_{eq}\Delta p=0$. Now we solve (40) subject to $A_{eq}\Delta p=0$. The optimal step may be found by solving $$\begin{bmatrix} H & A_{eq}^T \\ A_{eq} & 0 \end{bmatrix} \begin{bmatrix} \Delta p \\ \lambda \end{bmatrix} = \begin{bmatrix} -g \\ 0 \end{bmatrix} \quad (43)$$

where $\lambda$ is a vector of Lagrange multipliers. This procedure is equivalent to elimination of equality constraints and performing the minimization in (40) over $\Delta p \in \text{Null}(A_{eq})$. Finally, we may compute gradient g and Hessian H of the criterion function $C_{bf}(p)$ given by (36). Let us define the vector $$\hat{y} = [\text{vecr}(\hat{Y}_1) \ldots \text{vecr}(\hat{Y}_N)] \quad (44)$$

and in the same way y(p) as a result of vectorization of Y, where we emphasised the functional dependence on the parameter vector. The functional dependence is given by (16) and (38). Now we have $$C_{wls}(p) = \sum_{q=1}^{Q} w_q (\hat{y}_q - y_q(p))^2 \quad (45)$$

where $$Q = N\left(J + \binom{J}{2}\right)$$

and $\hat{y}_q$ and $y_q(p)$ are q-th entries of $\hat{y}$ and y(p) respectively, and weights $w_i$ are diagonal entries of the matrix $$W = \text{diag}([\omega_1 \ldots \omega_1 \ldots \omega_N \ldots \omega_N]). \quad (46)$$

Using (36) and (45) we may find the gradient of $C_{bf}(p)$ as $$g(p) = -2J(p)^T W(\hat{y}-y(p)) - \alpha g_{log}(p) \quad (47)$$

where J(p) is the Jacobian matrix of y(p) with entries $$j_{qr}(p) = \frac{\partial y_q(p)}{\partial p_r}$$

and $$g_{log}(p) = [f_{11}^{-1} \ldots f_{JM}^{-1} \ldots c_{11}^{-1} \ldots c_{NM}^{-1} \ 0 \ldots 0]^T. \quad (48)$$

The Hessian of $C_{bf}(p)$ is $$H(p) = 2J(p)^T W J(p) - \sum_{q=1}^{Q} w_q(\hat{y}_q - y_q(p)) G_q(p) + \alpha H_{log}(p) \quad (49)$$

where $G_q(p)$ is Hessian of the function $y_q(p)$ and $$H_{log}(p) = \text{diag}[f_{11}^{-2} \ldots f_{JM}^{-2} \ldots c_{11}^{-2} \ldots c_{NM}^{-2} \ 0 \ldots 0]). \quad (50)$$

Newton's method with equality constraints can be used if the Hessian H(p) given by (49) is positive definite on Null $(A_{eq})$. We see that the second term on the right hand side of (49) is in general indefinite and hence, H(p) is also indefinite. Now we have two options. The first is to use modified Newton's methods, where the indefinite Hessian H(p) is replaced with a positive definite matrix, which is close to the original Hessian in a certain sense. The second option is to simply ignore the second term in (49) and approximate the Hessian as the sum of the first and third term, which produces a positive definite matrix. This approach is sometimes called a Gauss-Newton method. We experimented with these two approaches and found that both of them lead to reliable algorithms. Finally, we decided to pick the Gauss-Newton method since it requires fewer computations. The Hessian approximated as $$H(p) \approx 2J(p)^T W J(p) + \alpha H_{log}(p) \quad (51)$$

is used to compute the step $\Delta p$ using (43). With positive definite Hessian on Null $(A_{eq})$ the computed step $\Delta p$ represents a decent direction. However, using (42) to compute the updated parameter vector may not lead to $C_{bf}(p) \geq C_{bf}(p_0)$, since the updated vector is based on the quadratic approximation (39). Also the logarithmic barrier function is approximated in the same way and hence, using (42) may violate nonnegativity constraints. These problems are resolved by introducing a procedure for step length control, which is also known as line search. Here, we may use a very simple line search where we compute the updated parameter vector as $$p = p_0 + \mu^k \Delta p. \quad (52)$$

where $0 \leq \mu \leq 1$ and k=0, 1, 2, ..., K. We start with k=0 and keep increasing k until all nonnegativity constraints are satisfied and $C_{bf}(p) < C_{bf}(p_0)$. These conditions are satisfied for sufficiently small step length since $\Delta p$ is a decent direction for $C_{bf}(p)$. The line search procedure may be the final part of the algorithm.

Let us summarize the algorithm for decomposition into rank-one terms (joint diagonalization). An embodiment algorithm may compute parameter estimates $$[\hat{F}, \hat{C}, \hat{k}] = \underset{F \geq 0, 1^T F = 1^T, C \geq 0, 1^T C = 1^T, k}{\text{argmin}} C_{wls}(F, C, k) \quad (53)$$

as follows. Starting from a random initial point we iteratively update the parameter vector p defined by (38). In each iteration we compute J(p) as partial derivatives of model equations (16), H(p) using (51), and H(p) using (47). Then we compute $\Delta p$ by solving equations (43) and update the parameter vector using line search (52). The iterations are repeated until convergence.

3.4 Decomposition into Block Terms

In this section we develop an algorithm for decomposition into block terms given by (19) and (20). Given the estimate $\hat{Y}$ we wish to compute the set of J×J symmetric matrices $Q_m$ given by (18) for m=1, ..., M and the N×M matrix $C=[c_{im}]$ by minimizing the following weighted least squares criterion $$C_{bwls} = \sum_{j=1}^{J} \sum_{n=j}^{J} \sum_{i=1}^{N} \omega_i \quad (54)$$

$$\left( \hat{Y}(j, n, i) - \sum_{m=1}^{M} \sum_{r=1}^{R_m} k_{rm} f_{jrm} f_{nrm} c_{im} \right)^2.$$

where we set $\omega_i = \hat{p}_i$. We may assume that the parameters M and $R = R_1 + \ldots + R_M$ are known or estimated from $\hat{Y}$ using (26)

and (33). We propose the following three-step procedure for decomposition of $\hat{Y}$ into block terms.

First, we observe that decomposition into block terms in (19) is equivalent to a decomposition into R rank-one terms, where the rank-one terms from the same block term have the same activity sequence vector $c_m=[c_{1m} \ldots c_{Nm}]^T$ for m=1,..., M. Hence, our first step is to compute a decomposition of Y into R rank-one terms. We impose appropriate nonnegativity and normalization constraints and use the algorithm described in Section III.B to compute $$[\tilde{F}, \tilde{C}, \tilde{k}] = \underset{F \geq 0, 1^T F = 1^T, C \geq 0, 1^T C = 1^T, k}{\operatorname{argmin}} C_{wls}(F, C, k). \quad (55)$$

where the matrices $\tilde{f}=[\tilde{f}_1 \ldots \tilde{f}_R]$, $\tilde{C}=[\tilde{c}_1 \ldots \tilde{c}_R]$ and $\tilde{k}=[\tilde{k}_1 \ldots \tilde{k}_R]$ define rank-one terms. In the second step we wish to group rank-one terms into block terms. Since we imposed nonnegativity and unit length constraints on the columns of $\tilde{C}$, they should form M clusters, where each cluster defines one block term. We find these clusters by applying agglomerative hierarchical clustering on the columns of $\tilde{C}$. Initially, each vector belongs to a separate cluster. These clusters are then successively merged so that in each step a Euclidean distance based criterion measuring dispersion around cluster centroids is minimized. We continue this process until the number of clusters is reduced to M. The clustering algorithm finds the parameters $R_1, \ldots, R_M$ and the matrix of cluster centroids $\tilde{C}^{(cl)}=[\tilde{c}_1^{(cl)} \ldots \tilde{c}_M^{(cl)}]$, which will be used in the third step, where we seek parameter estimates $$[\hat{F}_B, \hat{C}, \hat{k}_B] = \underset{\substack{F_B \geq 0, 1^T F_B = 1^T, \\ C=[c_{im} \in \{0,1\}], k_B}}{\operatorname{argmin}} C_{bwls}(F_B, C, k_B). \quad (56)$$

where $F_B=[F_1 \ldots F_M]$ and $k_B=[k_{11} \ldots k_{R_1,1} \ldots k_{1M} \ldots k_{R_M,M}]$ contain the parameters defined in (18). We may solve (56) using an alternating least squares strategy, where we find an update for one set of parameters assuming that all other parameters are known. Starting form an initial point computed using results from the first two steps, we perform the following two steps in each iteration of the algorithm.

Update for $\hat{F}_B$ and $\hat{k}_B$. Assuming $C=\hat{C}$ we seek the estimates $$[\hat{F}_B, \hat{k}_B] = \underset{F_B \geq 0, 1^T F_B = 1^T, k_B}{\operatorname{argmin}} C_{bwls}(F_B, C, k_B). \quad (57)$$

This problem may be solved using Newton's method with nonnegativity and unit norm constraints in the same way as described in Section III.C.

Update for $\hat{C}$. We find this update assuming $F_B=\hat{F}_B$ and $k_B=\hat{k}_B$. Using the vecr operator the criterion function (54) can be written as $$C_{bwls} = \sum_{i=1}^{N} \omega_i \left\| vecr(\hat{Y}_i) - \sum_{r=1}^{M} vecr(Q_r)c_{ir} \right\|_2^2 \quad (58)$$

where $Q_r$ is computed from $F_B$ and $k_B$ using (18). Let us define $c_i=[c_{i1} \ldots c_{iM}]^T$ for i=1, ..., N. From (58) we see that update for each $\hat{c}_i$ can be computed separately. The update may be found by solving $$\underset{c_i=[c_{im} \in \{0,1\}]}{\min} \|vec(Y_i) - [vec(Q_1) \ldots vec(Q_M)]c_i\|_2^2 \quad (59)$$

which is done by evaluating criterion function in (59) for each of the $2^M$ possible values of $c_i$ and picking the one that yields the lowest value of the criterion function. The algorithm iteratively computes updates for $\hat{F}_B$ and $\hat{k}_B$, and $\hat{C}$ until convergence. The matrix $\hat{C}$ contains estimates of activity sequences over the temporal segments computed using the clustering algorithm as described in Section II.A. We may also wish to find an estimate of B defined in (3), which contains activity sequences over time intervals of duration T defined in (3). Using the definition of parameters $W=[w_{ik}]$ and their estimates $\hat{W}=[\hat{w}_{ik}]$ obtained using EM algorithm, we have $\hat{B}=\hat{W}^T\hat{C}$.

4 Numerical Examples

Figure 1:
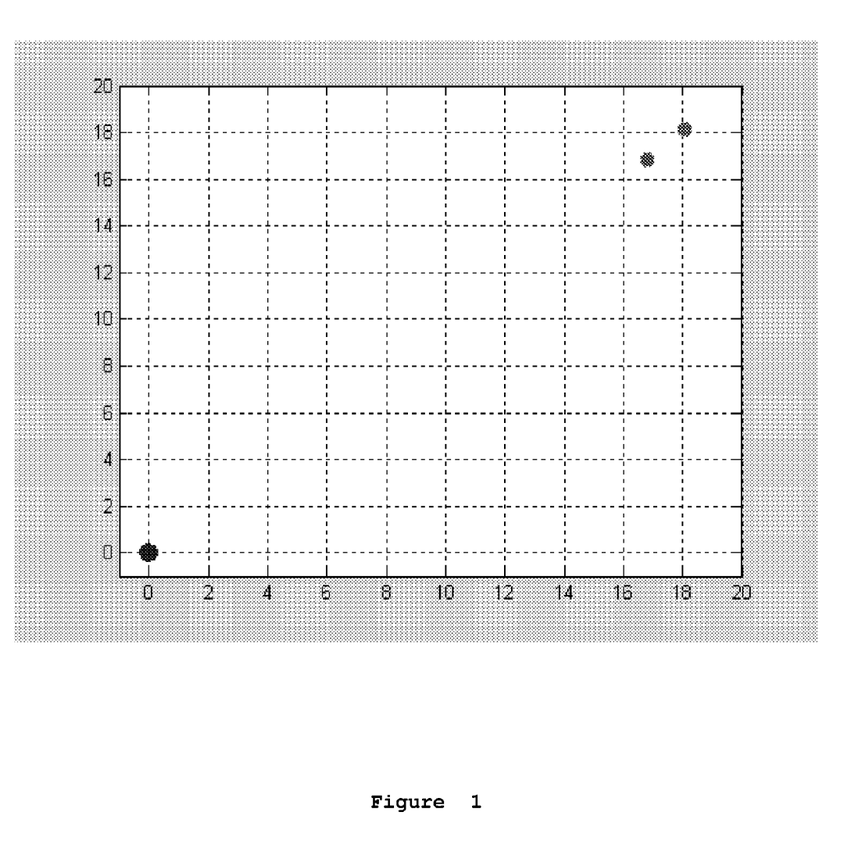
FIG. 1 shows locations of a sensor (dot in lower left corner) and sources (dots in upper right corner), in which distances are in meters.

We illustrate the proposed algorithm with three simulation examples. In all three examples we consider a setup with one sensor and two sources, whose locations are shown in FIG. 1. Channels between the sensor and sources are transfer functions measured in ORBIT room in WINLAB for the setup shown in FIG. 1. Thus, the real world propagation environment is faithfully reconstructed in the simulations.

Example 1

Figure 2:
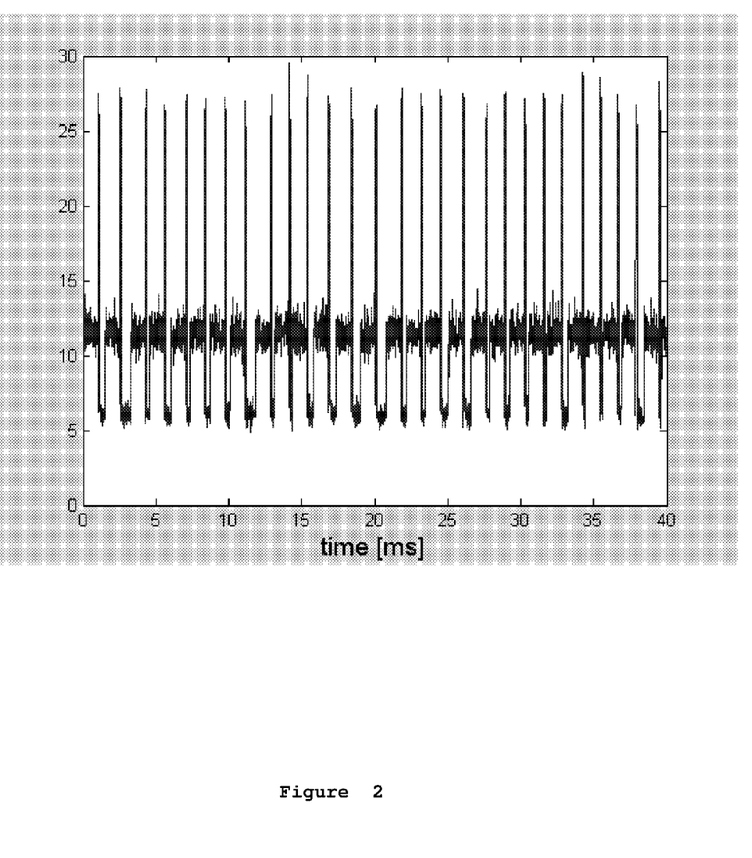
FIG. 2 is a power trace of a received signal computed with $T=10$ μs.
Figure 3:
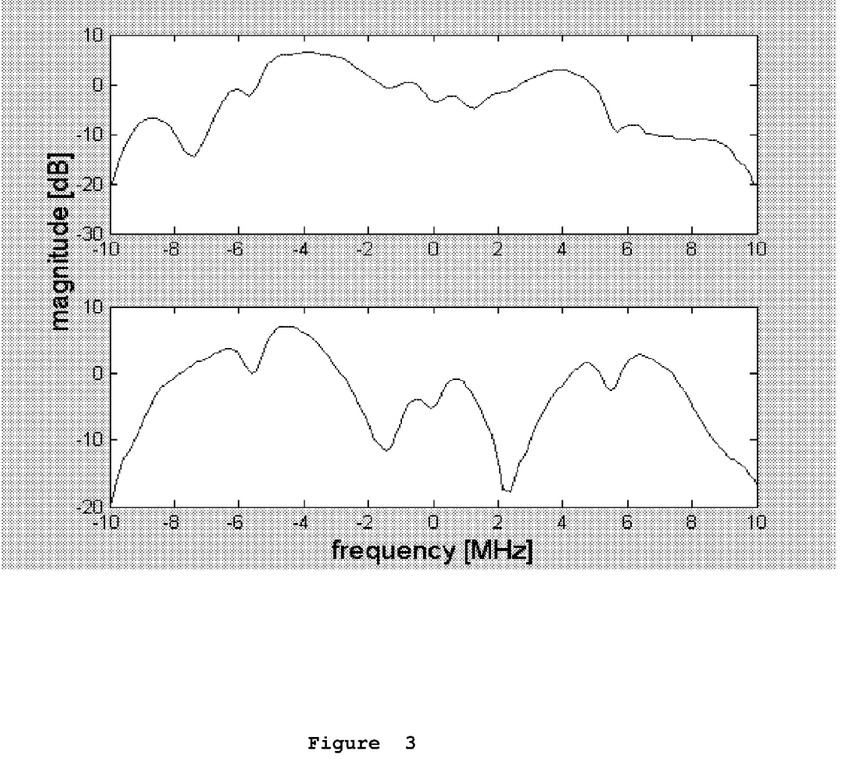
FIG. 3 shows a magnitude of diagonal entries (kurtosis values) of recovered trispectrum slices.
Figure 4:
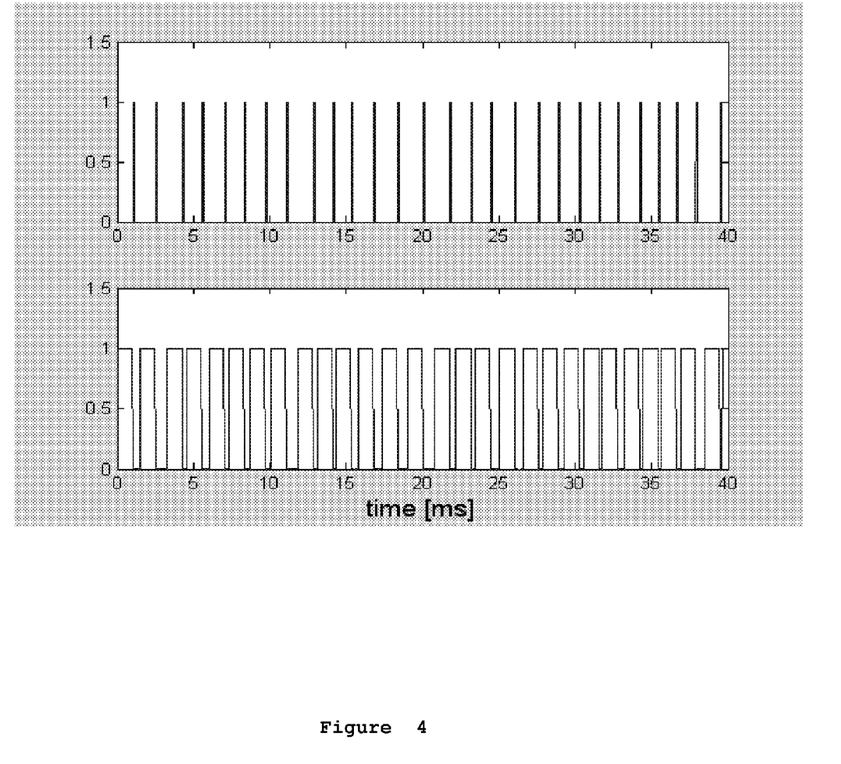
FIG. 4 shows recovered activity sequences.

Both sources are transmitting DBPSK signals with Barker sequence spreading used in 802.11b systems. The sources transmit in the same channel with equal power. The sensor observes one 20 MHz wide channel over the observation interval of 40 ms. FIG. 2 shows power trace of the received signal at the sensor, where each point is the average power computed over the interval of T=10 µs. We see typical 802.11 traffic: one source is sending packets and the other one is replying with acknowledgments. The received signal at the sensor is corrupted with additive white Gaussian noise. We define SNR for each source-sensor pair as the ratio of the average received source signal power (when the source is on) at the sensor and the average sensor noise power. The SNR values in this example are −0.48 and 5.07 dB. Both sources transmit linearly modulated signals and hence contribute rank-one components in the observed three-way array $\hat{Y}$. Applying the proposed method with R=M=2 recovers the trispectrum slice and activity sequence for each source, shown in FIGS. 3 and 4. FIG. 3 shows the magnitude of diagonal entries (kurtosis values) of the recovered trispectrum slices versus frequency. We see that the contributions from the two sources have been correctly recovered. The recovery of the two spectra in this example is possible due to the strong influence of the frequency selective channels between the sensor and the sources, which is evident in the recovered spectra in FIG. 3. In frequency flat channels these two sources would contribute only one rank-one component in $\hat{Y}$ since they use identical signals and hence, have proportional trispectrum slices (i.e., $Q_1=\alpha Q_2$ in (12)). In that case, we would get from (26) and (33) R=M=1. Applying our method for R=M=1 without imposing $c_{im} \in \{0,1\}$ would recover the common trispectrum slice and one temporal sequence describing the activity of both sources. We note that this decomposition is also a useful result of signal analysis.

Resolving the contributions of the two sources may also be possible by using multiple sensors.

Example 2

Figure 5:
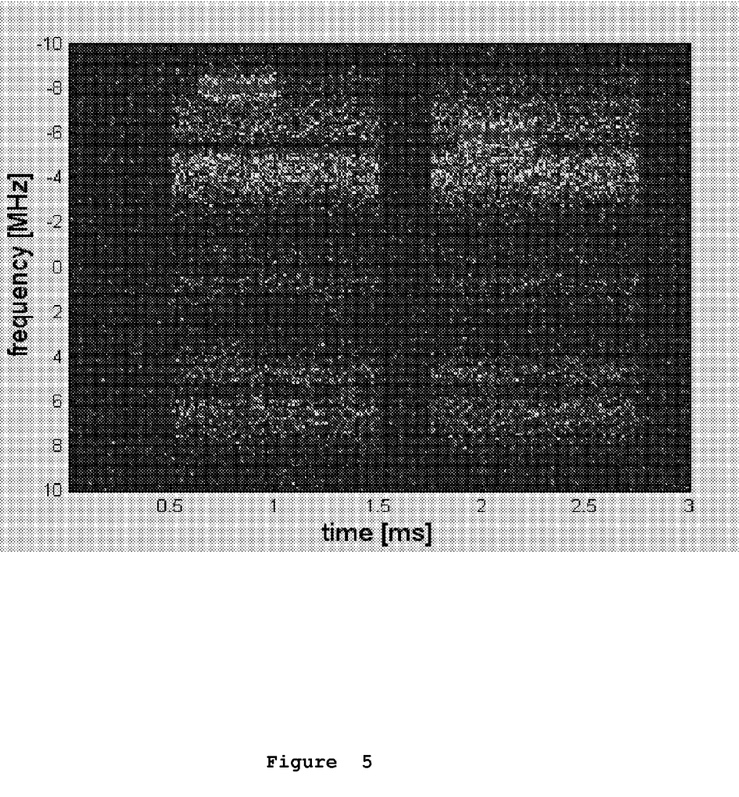
FIG. 5 is a spectrogram of another received signal computed with $T=10$ μs.
Figure 6:
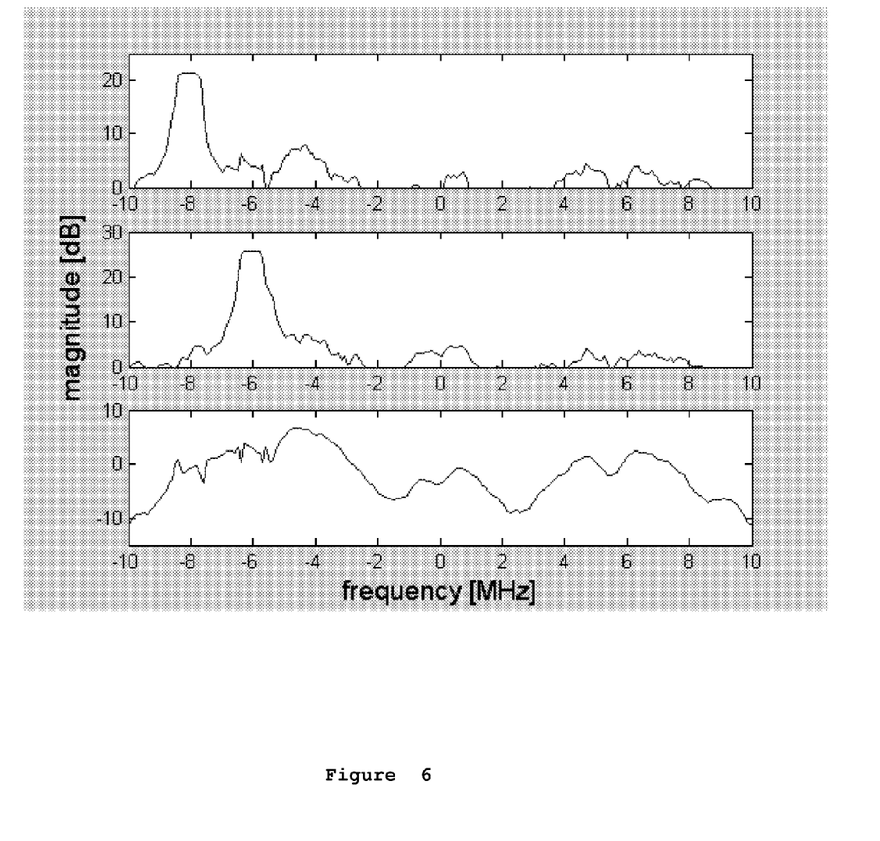
FIG. 6 shows a magnitude of diagonal entries (kurtosis values) of recovered trispectrum slices.
Figure 7:
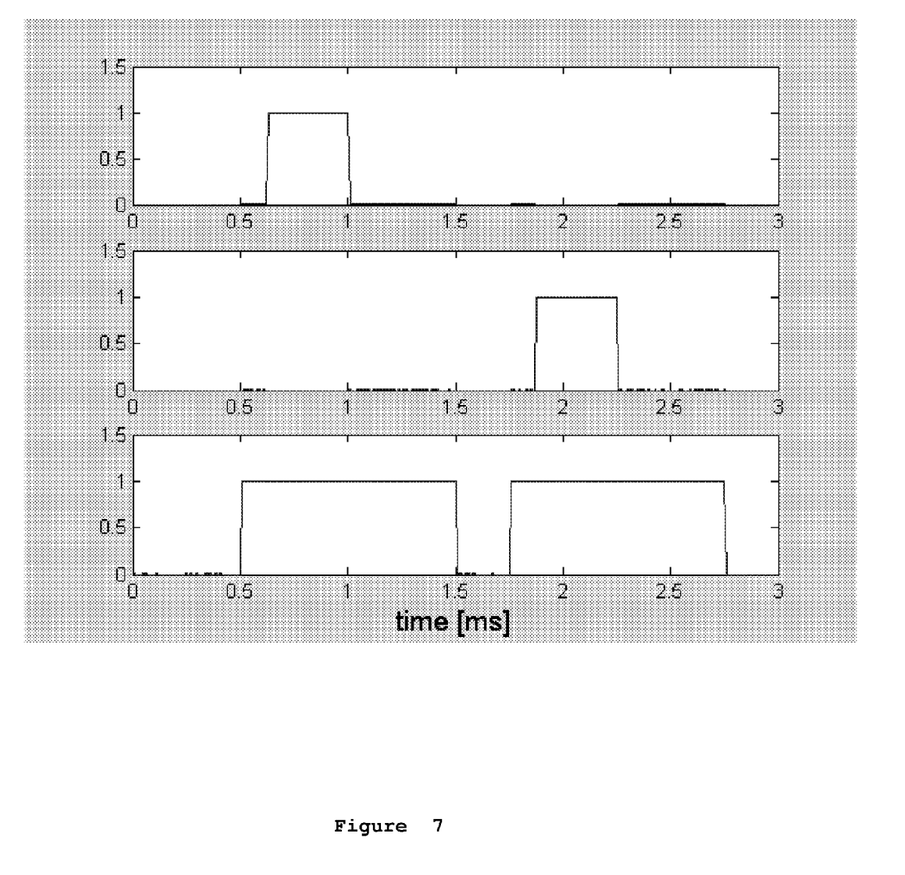
FIG. 7 shows recovered activity sequences.

One source is transmitting DBPSK signals with Barker sequence spreading and the other source is transmitting GFSK signal with frequency hopping used in Bluetooth systems. Each Bluetooth packet is transmitted over one of 79 different channels, where each channel is approximately 1 MHz wide. The SNR values are −0.48 (802.11b) and 6.76 dB (Bluetooth). The spectrogram of the received signal computed with time resolution of T=10 µs is shown in FIG. 5. The sensor observes one 20 MHz wide channel over the 3 ms time interval during which each source transmits two packets. Both Bluetooth packets collide with 802.11b packets as can be seen in FIG. 5. As already mentioned DBPSK signal with Barker sequence spreading is an example of linear modulation and hence, it contributes one rank-one term to the observed three-way array $\hat{Y}$. The two Bluetooth packets are transmitted using GFSK signals at two different frequencies. These two signals have different spectra and hence, Bluetooth source contributes two spectra in $\hat{Y}$. We conclude from this analysis that, in this example, M=3. GFSK signal is an FM signal with Gaussian pulse shaping. This signal is nonlinear. Hence, each GFSK signal contributes possibly multiple rank-one terms in $\hat{Y}$. We applied our method for M=3 and increasing number of rank-one terms starting with R=3 and observed the computed spectra and activity sequences. The best results were obtained for R=6. For R<6 some meaningful rank-one terms were missed and for R>6 some included rank-one terms were due to estimation errors in $\hat{Y}$. The recovered M=3 block terms have $R_1$=3 (due to the first GFSK signal), $R_2$=2 (due to the second GFSK signal), and $R_3$=1 (due to the DBPSK signal) rank-one terms. The results are shown in FIGS. 6 and 7, where the graphs in the two top rows correspond to GFSK signals and the bottom graphs to DBPSK signals with Barker sequence spreading. The contributions of different signals have been correctly resolved despite the collisions between the packets. In this example the first GFSK signal is modeled using $R_1$=3 rank-one terms and the second GFSK signal is modeled using $R_2$=2 rank-one terms, which seems inconsistent. This effect can be intuitively explained as follows. Each GFSK signal is nonlinear and requires infinite number of rank-one terms for perfect representation. However, it can be well approximated using several most significant rank-one terms. The observed three-way array $\hat{Y}$ includes systematic variation modeled by six rank-one terms that form three block terms and error term E. The systematic variation includes three rank-one terms from the first GFSK signal and two from the second GFSK signal because of significant difference in the received powers (about 4.8 dB) of these two signals, which is caused by frequency selective channel between the source and the sensor.

Example 3

Figure 8:
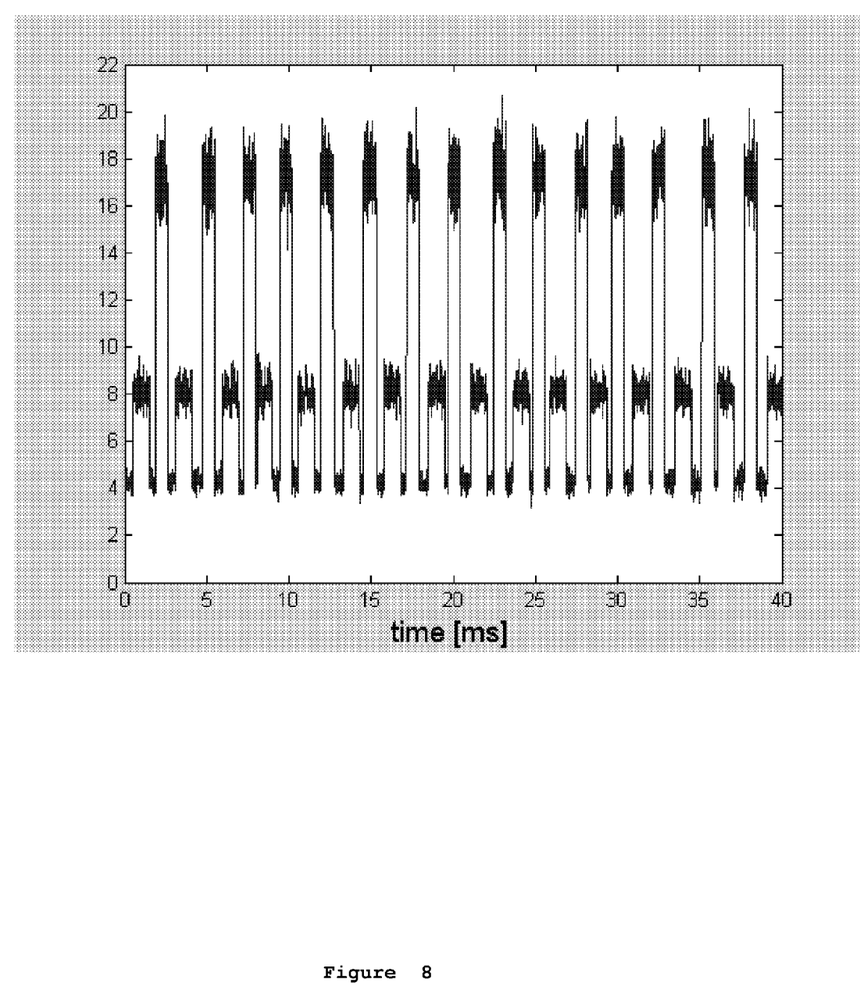
FIG. 8 shows a power trace of yet another received signal computed with $T=10$ μs.
Figure 9:
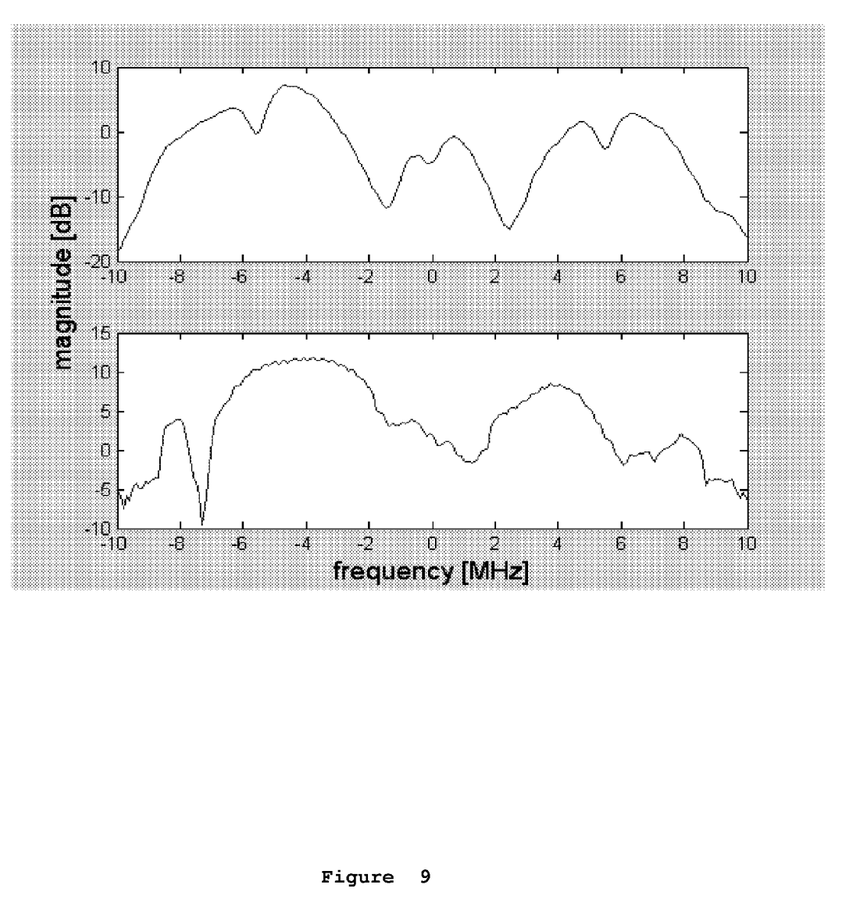
FIG. 9 shows a magnitude of diagonal entries (kurtosis values) of recovered trispectrum slices.
Figure 10:
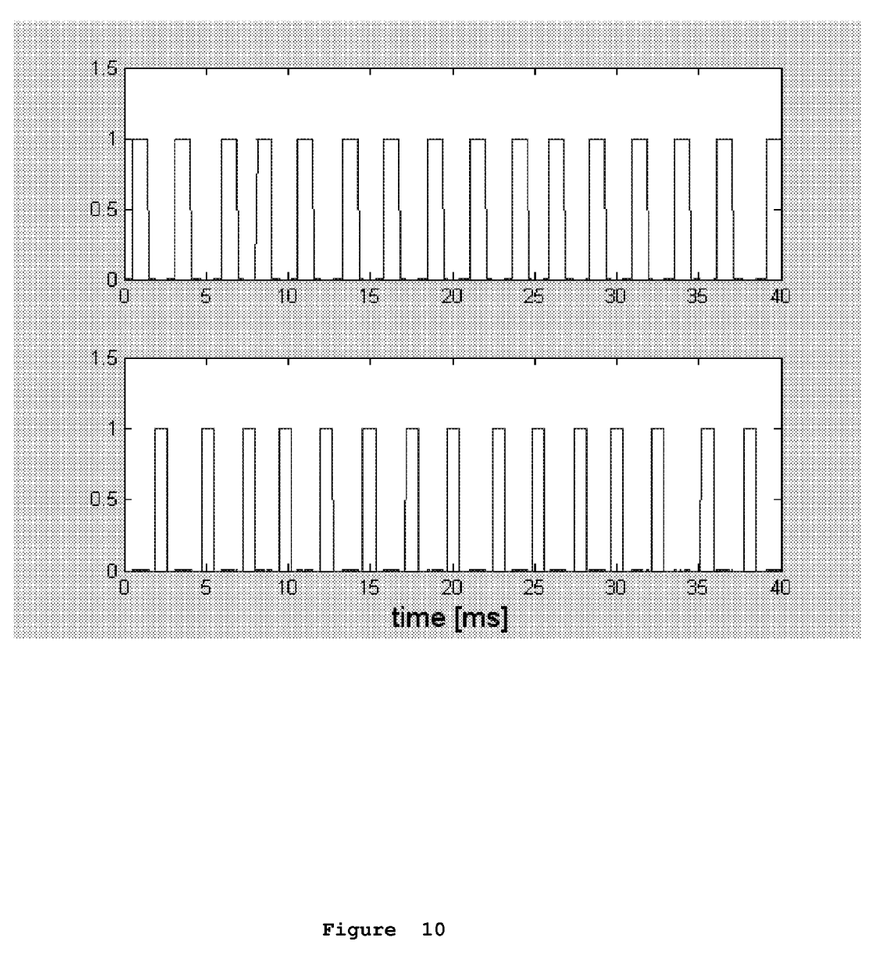
FIG. 10 shows recovered activity sequences.

One source is transmitting DBPSK signals with Barker sequence spreading and the other is transmitting OFDM signal used in 802.11a/g systems. The sensor observes one 20 MHz wide channel over the observation interval of 40 µs. The SNR values are −0.48 (DBPSK) and 4.84 dB (OFDM). The transmitted packets from the two sources are interleaved in time and there are no collisions as can be seen from FIG. 8. Obviously, in this example M=2. We know that DBPSK signal with Barker sequence spreading contributes one rank-one term to the observed three-way array $\hat{Y}$. OFDM signal is a superposition of 52 linearly modulated carriers. Hence, OFDM signal is nonlinear and its trispectrum slice consists of 52 rank-one terms. Now, we should apply our method for M=2 and R=53. Since this computation requires a lot of memory and is very slow we applied our method for M=2 and R=25. The two recovered block terms here have $R_1$=1 (due to the DBPSK signal) and $R_2$=24 (due to the OFDM signal) rank-one terms. The results are shown in FIGS. 9 and 10, where the graphs in the top rows correspond to the DBPSK signal and the bottom graphs to the OFDM signal. Again, we observe significant effects of the frequency selective channels on the recovered spectra. Although, the OFDM signal was modeled using only $R_2$=24 rank-one terms, the algorithm still captured the most significant signal components. This example illustrates potential computational difficulties in application of the proposed method. But it also illustrates how fourth order spectrum reveals the difference between single carrier (DBPSK) and multicarrier (OFDM) modulations, which cannot be seen form second order spectrum.

5 Conclusions and Future Work

This work shows that fourth order spectrum can be a very useful tool for analysis of packet based radio signals. Fourth order spectrum contains important information about the received signal which is not contained in the second order spectrum, and thus it enables design of qualitatively different algorithms. Extension of the method that use multiple sensors may also be possible.

What is claimed is:

1. A system for detecting and identifying non-persistent signals in an observed frequency band in a packet-based radio network having multiple active sources comprising:
    a radio frequency device for receiving an RF signal and implementing steps of a method of analysis including:
        performing a second order statistical analysis of said RF signal to determine a plurality of time segments within an observation interval having one or more active sources transmitting, wherein the statistical analysis comprises determining at least a local maximum by repeatedly applying a temporal algorithm to the RF signal starting from random initial points until the algorithm converges monotonically on the local maximum;
        for each of the plurality of time segments, performing a fourth order statistical analysis of said RF signal to identify two-dimensional slices representing individual active sources within said time segments; and
        arranging the two-dimensional slices into a three-way array, wherein low rank decomposition of the three-way array provides for recovery of spectra and associated activity sequences of individual components in the RF signal.

2. The system of claim 1 wherein said received RF signal is the sum of one or more non-Gaussian active sources and Gaussian sensor noise.

3. The system of claim 1 wherein said step of performing a second order statistical analysis comprises the steps of:
    determining the power spectral density (PSD) of said RF signal over said observation interval;
    temporally segmenting said RF signal based on said power spectral density; and
    identifying clusters corresponding to a union of said temporal segments having the same combination of active sources.

4. The system of claim 3 wherein said step of performing a fourth order statistical analysis further comprises the steps of:

determining the trispectrum of said RF signal over said observation interval; and identifying trispectrum slices corresponding to each of said active sources in said identified clusters.

5. The system of claim 4 wherein a trispectrum slice having a non-zero kurtosis is identified as corresponding to an active source.

6. The system of claim 4 wherein a trispectrum slice having a zero kurtosis is identified as corresponding to Gaussian sensor noise.

7. The system of claim 5 wherein said active sources are characterized as linearly modulated sources or non-linearly modulated sources.

8. The system of claim 4 wherein said non-linearly modulated sources can be characterized as a sum of smaller linearly modulated sources.

9. The system of claim 3 wherein said observational interval is defined as the product of the time resolution of the PSD and the number of measurements over said observation interval.

10. The system of claim 3 wherein said PSD has a frequency resolution of said total observed frequency band divided into equal frequency steps.

\* \* \* \* \*